United States Patent [19]
Rass

[11] Patent Number: 5,419,083
[45] Date of Patent: May 30, 1995

[54] ELECTRIC-FENCE GATE

[76] Inventor: Hans A. Rass, S606 Hirst Rd., Reedsburg, Wis. 53959

[21] Appl. No.: 264,153

[22] Filed: Jun. 22, 1994

[51] Int. Cl.⁶ ............................................. E05F 11/00
[52] U.S. Cl. ........................................ 49/197; 49/59; 49/327
[58] Field of Search ................... 49/59, 197, 331, 332, 49/327; 256/10

[56] References Cited

U.S. PATENT DOCUMENTS

| | | | |
|---|---|---|---|
| 1,156,161 | 10/1915 | Lightburne | 49/331 |
| 1,298,709 | 4/1919 | Herrmann | 49/332 |
| 1,910,220 | 5/1933 | Kremser et al. | 49/331 |
| 1,963,212 | 6/1934 | Phillips | 49/331 |
| 2,605,565 | 8/1952 | Meyer, Jr. | 49/59 |
| 4,708,322 | 11/1987 | Ratcliffe | 49/59 X |

*Primary Examiner*—Philip C. Kannan
*Attorney, Agent, or Firm*—Jacobson, Price, Holman & Stern

[57] ABSTRACT

A gate for an electrified fence is designed to permit opening and closing by a vehicle operator who wishes to pass through the gate from either direction. Opening and closing the gate is effected without disconnecting the electrical wire on the gate.

15 Claims, 4 Drawing Sheets

ELECTRIC-FENCE GATE

FIELD OF THE INVENTION

Electrical or electrified fences are regularly used to confine livestock in a pasture.

BACKGROUND

According to well-established practice, electrically-charged bare wire is mounted on fences at a height from 2 to 3 feet from the ground in order to confine livestock to specified pasture areas. The wires are fastened in position with appropriate insulators. Any contact by an animal with the charged wire causes an electrical shock to the animal. A number of problems are encountered in providing gates for such fences, as people or vehicles passing through such a gate must avoid contact with the charged wire. To pass the fence, the charged wire must be inactivated or a swinging gate must be installed.

Several solutions have been found. Some of these include having the wire pass beneath the ground for a distance covered by a gate and/or having the wire disconnected each time the gate is opened.

For a vehicle to pass through any such gate, the vehicle operator has to dismount and disengage the gate wire or open the gate in order to permit his vehicle to pass. Moreover, after the vehicle has gone through the gate, the operator must again leave his vehicle and close the gate and engage the gate wire.

SUMMARY OF THE INVENTION

The subject invention has several distinct aspects which cooperate to provide an electric-fence gate which can be opened and closed by a person in a vehicle and who desires to pass through without disconnecting electrical current associated with the gate. One aspect of the invention involves a pivotal mounting of a gate bar on two anchor plates and counterbalancing the gate bar with counterweight means so that it may readily be raised or lowered with a minimum of force.

Another aspect of the invention is the opening and closing means operatively connected to the gate bar in a manner which permits their use without requiring a vehicle driver to leave the vehicle.

A still further aspect of the invention is in a combination of gate bar mounting plates with corresponding anchor plates on which the gate bar mounting plates (to which respective ends of the gate bar are secured) are pivotally mounted.

Another aspect of the invention is in providing an electric-fence gate through which electrical current can pass continuously, whether the gate is in open or closed position.

A still further aspect of the invention is in the relationship between retainer posts on either side of the electric-fence gate (when the latter is in closed position) for holding and conducting an electrical conductor from the electric fence to the gate bar.

An object of this invention is to provide an electric-fence gate in which a charged bare wire does not have to be disengaged when the gate is opened, and the gate can be opened and closed by the operator of a vehicle (automobile, tractor or other farm equipment) passing therethrough without having the operator leave the vehicle.

Another object is to provide such a fence gate with a minimum of specially-designed parts.

Further objects of the invention will be readily appreciated from the description which follows.

DETAILS

Figure 1:
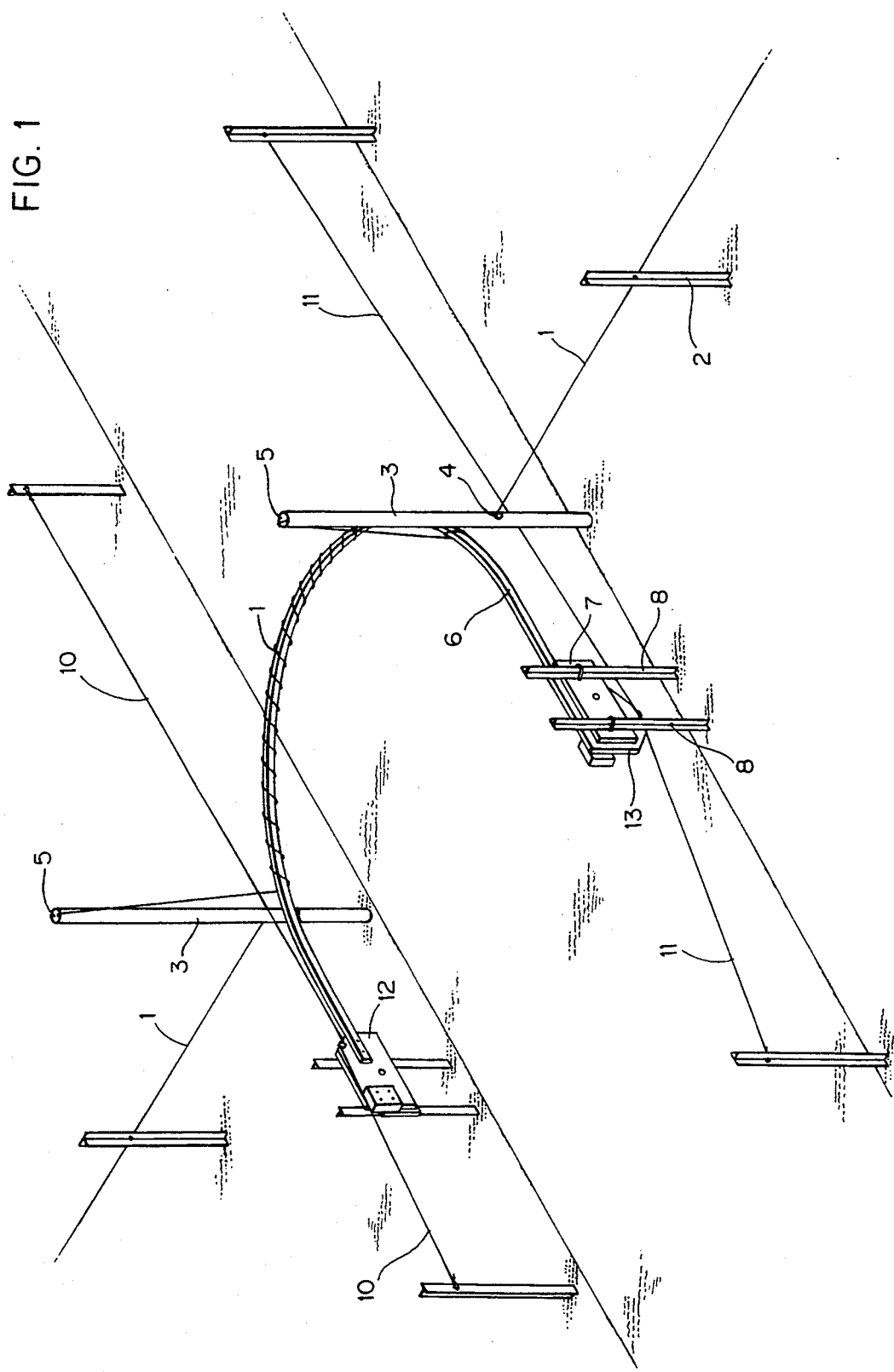
FIG. 1 is an isometric view of a gate for an electrified fence.

With reference to FIG. 1, which illustrates one embodiment of this invention, with a gate in closed position in an electrified fence surrounding a pasture. An electrical-fence wire 1 passes from fence post 2 to a retaining post 3 through a hole 4 therein so that the wire is maintained at about the same height above the ground (except on either side of the gate or an open gate). The wire then passes through an opening 5 in the upper part of retainer post 3, from which it passes to and along gate bar 6, substantially traversing the opening covered by the gate.

Electrical wire then passes from the gate bar to a similar opening 5 in a second retainer post 3, before passing through a similar opening 4 in that retainer post and then to successive fence posts and to the next gate.

A short distance from each of the retainer posts, and parallel to each other on the side of the retainer posts which is away from the pasture, are two anchor plates 7, which are advantageously secured solidly to the ground, e.g., by fence posts 8.

The gate bar 6 has two ends which are rotatably mounted on respective anchor plates 7 so that the gate may be opened by rotating the gate bar about respective carrier hubs secured to the anchor plates.

To facilitate such rotation, counter-weights 9 are used to counter-balance the weight of the gate bar.

In one embodiment of the invention a road or path is provided for vehicles to pass through the gate. Cables (10, 11) are provided on both sides of the path or road for operating the gate. The cables normally extend from a fence post on one side of the anchor plate to a gate bar mounting plate (12, 13) and then to a fence post on the opposite side of the corresponding retainer post 3. The height of the cable at the respective fence post is suitable for use by a vehicle operator without leaving the vehicle. Thus, a vehicle operator approaching the gate from outside of the pasture can open the gate by pulling on cable 10. After passing through the opening, the vehicle operator can close the gate in similar fashion from the other side of the gate. Likewise, a vehicle operator passing the gate from inside the pasture can similarly pull on cable 11 to open and, subsequently, to close the gate.

There are certainly numerous other and more sophisticated ways to open and close the gate, e.g. by appropriately-placed electric eyes or even push buttons connected to means suitable for exerting appropriate tension on the respective cables.

The electric wire on the gate bar can be secured to the gate bar in any fashion. It can be wrapped around the gate bar, as illustrated in FIG. 1, or it can be secured along the gate bar with appropriate insulators. Although not shown in FIG. 1, the gate bar can have supporting posts extending to the ground when the gate is in closed position. In any event, the electrical fence wire should be maintained at approximately the same height along the entire fence, including the gate, when the latter is in closed position.

In FIG. 1 the gate bar is illustrated as arcuately shaped. The shape, however, is not critical; the electrified portion of the gate bar optionally lies in a direct line between the retainer posts. An appropriate configuration is selected to accommodate the size of vehicles that require access through the gate to and from the pasture.

Figure 3:
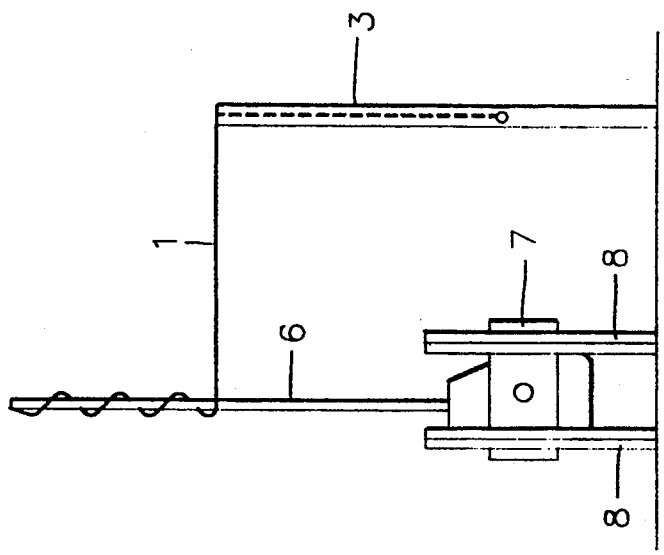
FIG. 3 is a side view of the gate in open position.
Figure 2:
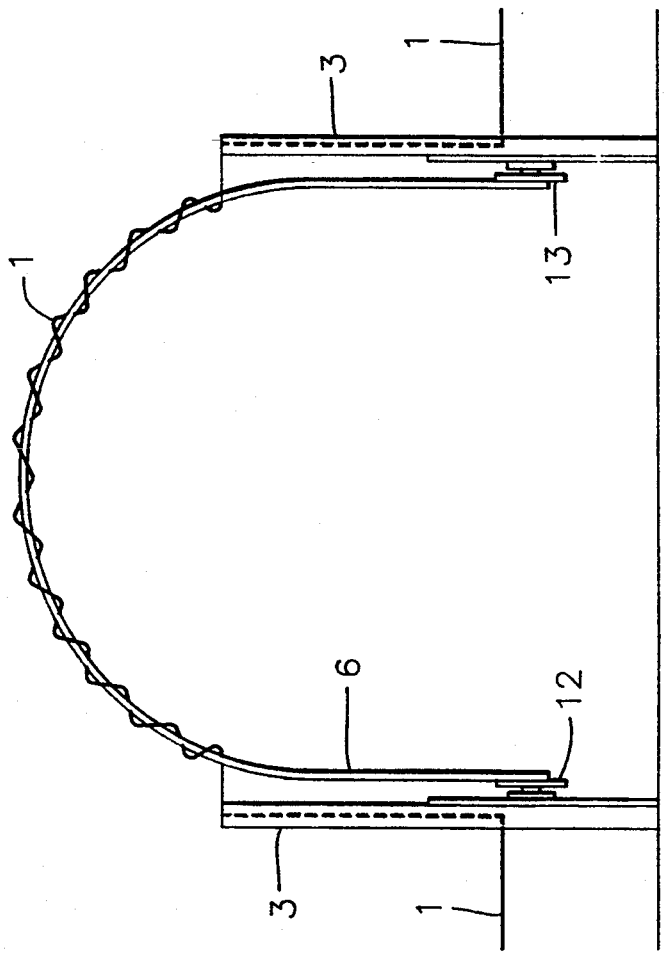
FIG. 2 is a front view of the gate in open position.

FIGS. 2 and 3 show the gate in open position. FIG. 2 is a front view, whereas FIG. 3 is a side view. From these views, particularly from FIG. 3, it is clear that the length of electrical wire extending from opening 5 to gate bar 6 should be sufficient to extend over the distance from the retainer post to the axis of rotation of the gate bar 6 on the mounting plate (12, 13).

Figure 4:
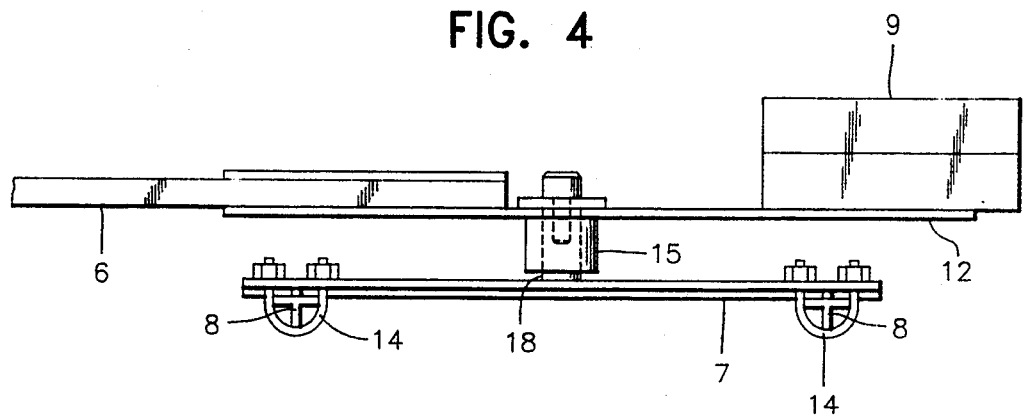
FIG. 4 is a top view of a gate bar mounting plate rotatably mounted on an anchor plate when the gate is in closed position.

FIG. 4 illustrates one embodiment for rotating the gate bar about a pivot axis on the anchor plate. In this embodiment two "U" clamps 14 secure the anchor plate to fence posts 8. The anchor plate is fitted with a stud 18 and a carrier hub 15, on which gate bar mounting plate 12 is rotatably mounted. One end of gate bar 6 is secured to the gate bar mounting plate on one side of carrier hub 15, and counterweight 9 is secured to the opposite side of carrier hub 15. The counterweight is positioned on the gate bar mounting plate so that it substantially counterbalances about half of the weight of gate bar 6. The rest of the weight of gate bar 6 is substantially counterbalanced by a similar weight secured to gate bar mounting plate 13. The counterweights are sufficient to enable any person to operate the gate with ease or to make such operation otherwise available by suitable electronic or electric means.

A separate gate bar mounting plate is not essential. The ends of the gate bar can be provided with means to cooperate with bud 15 for rotating thereon and, at their extremities, with appropriate counterweights.

Figure 5:
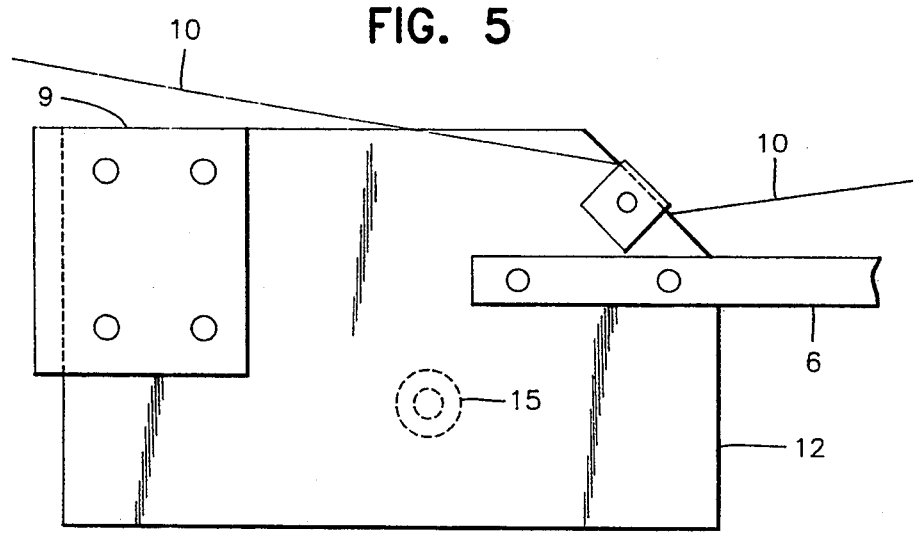
FIG. 5 and FIG. 6 are side views of gate bar mounting plates 12 and 13, respectively, when the gate is in closed position.
Figure 6:
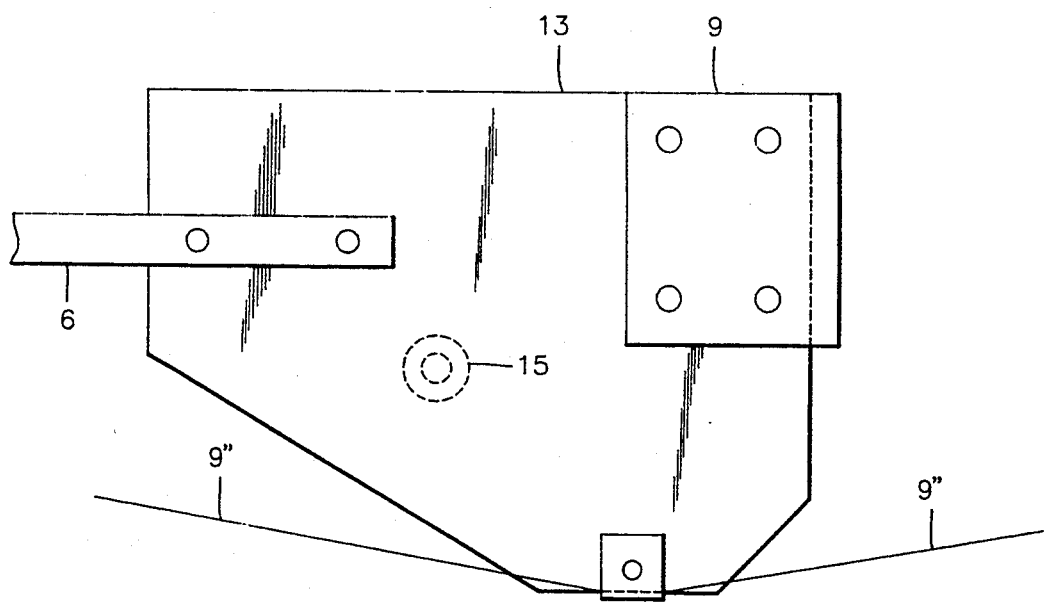

When a cable is used to operate the gate, FIGS. 5 and 6 illustrate how the respective cables may be mounted.

Gate bar 6 and counterweight 9 are advantageously located a distance above carrier hub 15. The actual positioning of said parts assures a steady pull to the rear of the gate when the gate is standing upright. The travel distance of gate bar 6 is determined by adjustable string 16, which connects the top of retainer post 3 to gate bar 6. Also or alternatively, suitable stops (not shown) are installed to limit the rotation of gate bar mounting plates (12, 13) to 90° (that which is advantageous for maintaining the gate in open position while a vehicle passes therethrough).

To assure having the gate stay in open position when desired, the sum of the masses of counterweights 9 and gate bar 6 on the side of carrier hub 15 away from retainer posts 3 must be greater than that on the other side of the carrier hub. In the preferred arrangement, virtually the entire mass of both counterweights and the gate bar are on that side of the carrier hub to assure maintaining the gate in open position until positive action is taken to return it to closed position.

In the illustrated embodiment, the opening and closing of the gate is achieved by pulling on a non-conducting cable at a fixed distance from the gate. There is a left hand (10) and a right hand (11) pulling cable. The gate is thus operable from either side. When approaching the gate from the outside, pulling cable 10 (on the left) is pulled to open the gate by raising the gate bar into upright position. After passing through the gate, gate bar 6 is lowered by pulling cable 10, which will lower the gate to its closed position (parallel to the ground).

Although pulling cables 10 and 11 are illustrated in FIG. 1 as taut on both sides of gate bar mounting plates 12 and 13, respectively, this is achieved only with springs (or other slack taking devices) at all four ends of the cables. In practice, when the gate is closed, there is normally slack in cable 10 between gate bar mounting plate 12 and the far fence post and in cable 11 between the near fence post and gate bar mounting plate 13. There is slack in the opposite lengths of cable when the gate is opened.

Figure 7:
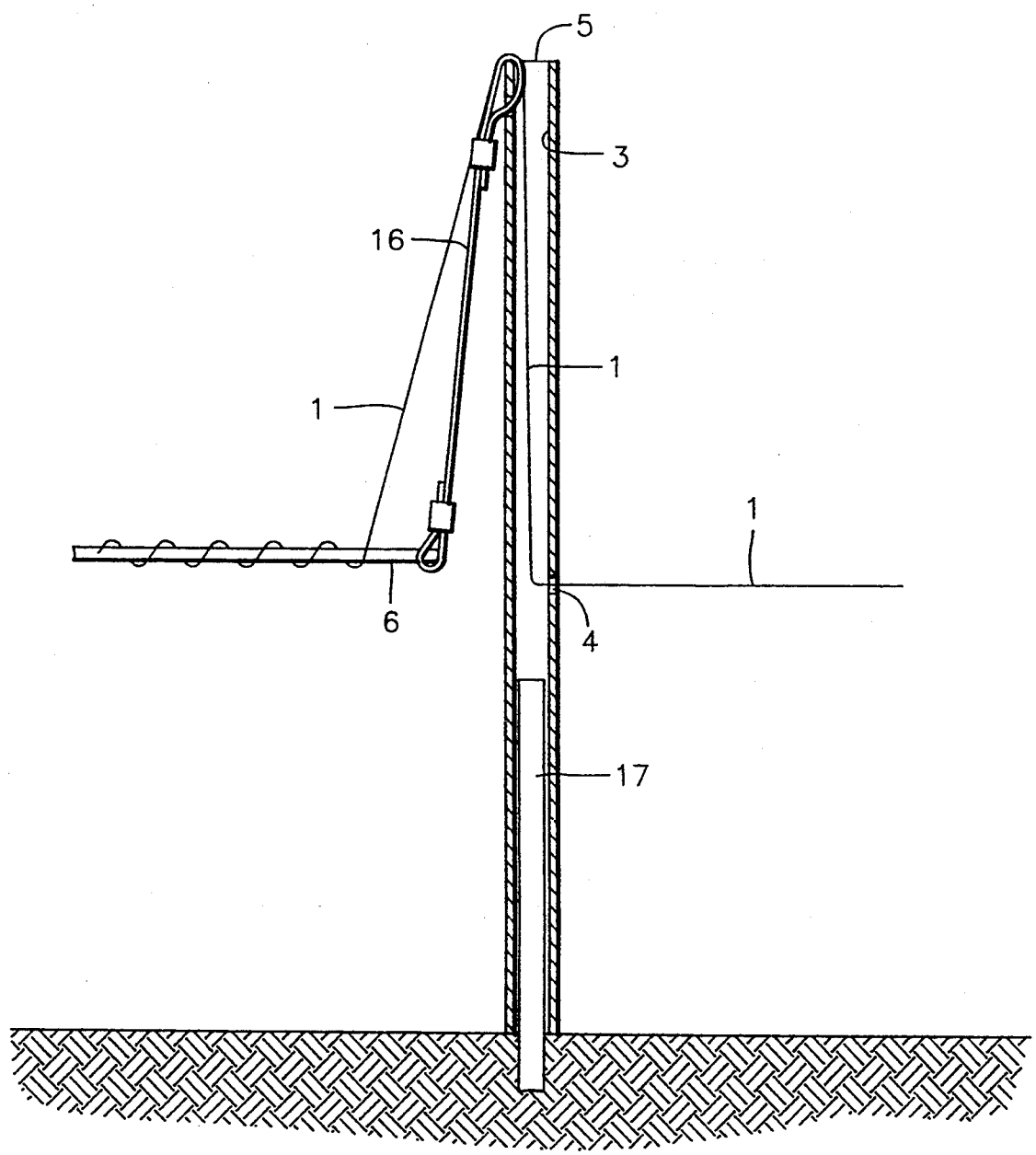
FIG. 7 is a side view of a retainer post (fitted with an adjustable string) when the gate bar is in closed position.

One way of installing the retainer posts 3 is achieved by ramming a fence post 17 (FIG. 7) into the ground at the required location. To avoid contact with the electrical fence wire 1, the top of fence post 17 must be below the wire entrance hole 4 in retaining post 3.

The electrically-charged wire 1 is always retained at a significant distance from all mechanically-operated parts. All parts retaining electrical fence wire 1 are made of non-conductive plastic to assure a shock-free operation.

Fence posts available on the market have notches along the mounting surface to prevent wires secured thereto from sliding down. With this type of fence posts the lower edge of anchor plates 7 is advantageously bent inwardly toward the fence posts to which they are secured to engage the notches thereon and thus prevent their sliding.

The invention and its advantages will be readily understood from the preceding description. It is apparent that various changes may be made in the form, construction and arrangement of the parts without departing from the spirit and scope of the invention or sacrificing its material advantages. The forms described in the preceding text and illustrated in the drawings are merely preferred embodiments.

What is claimed is:

1. A fence gate comprising a gate bar, two anchor plates and counterweight means;
    the gate bar having two ends, and means close to each end for pivotally mounting that end on a separate one of the anchor plates so that virtually all of the gate bar is on one side of the pivotally mounting means;
    each of the anchor plates being in a secured position so that the gate bar can rotate about a fixed axis at a preset height; and
    the counterweight means, at least substantially sufficient in amount and position, being secured to each end of the gate bar to counterbalance the part of the gate bar which is on the one side of the pivotally mounting means.

2. A fence gate of claim 1 wherein each gate bar end is in the form a rotatable plate which is pivotally mounted on a different one of the anchor plates and to which appropriate counterweight means are secured.

3. A fence gate of claim 1 wherein the gate bar has an electrical wire secured thereto.

4. A fence gate of claim 3 in combination with two retainer posts, one on each side of the gate when the gate is in closed position;

each retainer post having means to conduct the electrical wire to said gate bar, including means to introduce the wire into each retainer post and means, remote therefrom, to permit the wire to exit from each post and extend to the gate bar, so that electricity may flow uninterruptedly through the wire whether the gate is in opened or closed position.

5. A fence gate of claim 1 further comprising gate cable string means on each retainer post, connecting that post with the gate bar, the gate cable string means being of a length and positioned so as to preclude tension on the wire extending from the retainer post to the gate bar.

6. A fence gate of claim 1 further comprising opening and closing means;
the opening and closing means being operatively connected to said gate bar.

7. A fence gate of claim 6 wherein the opening and closing means extend from either side of said pivotally mounting means to permit operating the gate from a remote position.

8. A fence gate of claim 6 wherein each gate bar end is in the form a rotatable plate which is pivotally mounted on a different one of the anchor plates and to which appropriate counterweight means are secured.

9. A fence gate of claim 8 wherein the opening and closing means are in the form of cables attached to and extending in opposite directions from the rotatable plate.

10. A fence gate of claim 6 having an electrical conductor secured to the gate bar and extending along a significant length thereof.

11. A fence gate of claim 10 in combination with two retainer posts, one on each side of the gate when the gate is in closed position;
each retainer post having means to conduct the electrical conductor to said gate bar, including means to introduce the conductor into each retainer post and means, remote therefrom, to permit the conductor to exit from each post and extend to the gate bar, so that electricity may flow uninterruptedly through the conductor and along the gate bar whether the gate is in opened or closed position.

12. A fence gate of claim 11 further comprising gate cable string means on each retainer post, connecting that post with the gate bar, the gate cable string means being of a length and positioned so as to preclude tension on the wire extending from the retainer post to the gate bar.

13. A combination of anchor plates, gate bar mounting plates, counterweights and a gate bar;
each anchor plate having a carrier hub substantially centrally positioned thereon;
each gate bar mounting plate rotatably connected to a different carrier hub for rotation in a plane parallel to that of one of the anchor plates;
the gate bar having two opposite ends secured to different gate bar mounting plates so that the gate bar extends in one direction from the gate bar mounting plate;
each counterweight being at least substantially sufficient to counterbalance its share of the weight of the gate bar and being secured to the gate bar mounting plate on a side of the carrier hub which is opposite that from which the gate bar extends.

14. A combination of claim 13 wherein each anchor plate is secured to the ground in a position perpendicular to the ground.

15. A gate bar in combination with two retainer posts on opposite sides of the gate bar and with an electrical conductor;
each retainer post having means to receive the electrical conductor at one height above ground level and means to release the electrical conductor at a different height above ground level;
the gate bar traversing a distance between the retainer posts; and
the electrical conductor running from the releasing means of one retainer post to the gate bar, along the gate bar to a position approximating that of the other retainer post and to the releasing means of said other retainer post.

* * * * *